US008480791B2

(12) United States Patent  (10) Patent No.: US 8,480,791 B2
Yang et al. (45) Date of Patent: *Jul. 9, 2013

(54) METHODS OF MANUFACTURING MERCURY SORBENTS AND REMOVING MERCURY FROM A GAS STREAM

(75) Inventors: Xiaolin D. Yang, Edison, NJ (US);
David M. Stockwell, Westfield, NJ (US);
Pascaline H. Tran, Holmdel, NJ (US);
Lawrence Shore, Jerusalem (IL)

(73) Assignee: BASF Corporation, Florham Park, NJ (US)

( * ) Notice: Subject to any disclaimer, the term of this patent is extended or adjusted under 35 U.S.C. 154(b) by 344 days.

This patent is subject to a terminal disclaimer.

(21) Appl. No.: 12/751,201

(22) Filed: Mar. 31, 2010

(65) Prior Publication Data

US 2010/0266468 A1 Oct. 21, 2010

Related U.S. Application Data

(63) Continuation of application No. 11/763,691, filed on Jun. 15, 2007, now Pat. No. 7,753,992.

(60) Provisional application No. 60/805,188, filed on Jun. 19, 2006.

(51) Int. Cl.
*B01D 53/06* (2006.01)
*B01D 53/64* (2006.01)

(52) U.S. Cl.
USPC .................................. 95/107; 95/134; 95/900

(58) Field of Classification Search
USPC .............. 95/90, 107, 134, 900, 902; 423/210; 110/203, 345; 502/60, 79, 400
See application file for complete search history.

(56) References Cited

U.S. PATENT DOCUMENTS

| | | | |
|---|---|---|---|
| 3,663,165 A | 5/1972 | Haden, Jr. et al. | |
| 4,094,777 A | 6/1978 | Sugier et al. | |
| 4,493,902 A | 1/1985 | Brown et al. | |
| 4,699,893 A | 10/1987 | Andrews et al. | |
| 4,708,853 A | 11/1987 | Matviya et al. | |
| 4,895,638 A | 1/1990 | Aufdembrink et al. | |
| 4,902,662 A | 2/1990 | Toulhoat et al. | |
| 5,306,474 A | 4/1994 | Kida et al. | |
| 5,405,593 A | 4/1995 | Knudson | |
| 5,409,522 A | 4/1995 | Durham et al. | |
| 5,472,594 A | 12/1995 | Tsang et al. | |
| 5,505,766 A | 4/1996 | Chang | |
| 5,569,436 A | 10/1996 | Lerner | |
| 5,607,496 A | 3/1997 | Brooks | |
| 5,618,508 A | 4/1997 | Suchenwirth et al. | |
| 5,695,726 A | 12/1997 | Lerner | |
| 5,702,589 A | 12/1997 | Tsang et al. | |
| 5,827,352 A | 10/1998 | Altman et al. | |
| 5,854,173 A | 12/1998 | Chang et al. | |
| 5,868,829 A | 2/1999 | Biermann et al. | |
| 5,897,688 A | 4/1999 | Voogt et al. | |
| 5,948,143 A | 9/1999 | Sjostrom | |
| 6,027,551 A | 2/2000 | Hwang et al. | |
| 6,136,072 A | 10/2000 | Sjostrom et al. | |
| 6,375,909 B1 | 4/2002 | Dangtran et al. | |
| 6,521,021 B1 | 2/2003 | Pennline et al. | |
| 6,558,454 B1 | 5/2003 | Chang et al. | |
| 6,638,485 B1 | 10/2003 | Iida et al. | |
| 6,656,347 B2 | 12/2003 | Stockwell et al. | |
| 6,673,235 B2 | 1/2004 | Harris et al. | |
| 6,695,894 B2 | 2/2004 | Chang et al. | |
| 6,712,878 B2 | 3/2004 | Chang et al. | |
| 6,719,828 B1 | 4/2004 | Lovell et al. | |
| 6,770,250 B2 | 8/2004 | Cooper et al. | |
| 6,808,692 B2 | 10/2004 | Oehr | |
| 6,818,043 B1 | 11/2004 | Chang et al. | |
| 6,953,494 B2 | 10/2005 | Nelson, Jr. | |
| 7,048,781 B1 | 5/2006 | Lovell | |
| 7,572,421 B2 | 8/2009 | Yang et al. | |
| 7,753,992 B2 * | 7/2010 | Yang et al. | ...................... 95/107 |
| 2003/0103882 A1 | 6/2003 | Biermann et al. | |
| 2003/0104937 A1 | 6/2003 | Sinha | |
| 2003/0118493 A1 | 6/2003 | Cooper et al. | |
| 2003/0176396 A1 | 9/2003 | Shea et al. | |
| 2003/0206843 A1 | 11/2003 | Nelson, Jr. | |
| 2004/0003716 A1 | 1/2004 | Nelson, Jr. | |
| 2004/0081606 A1 | 4/2004 | Cooper et al. | |
| 2004/0202596 A1 | 10/2004 | Honjo et al. | |
| 2005/0129597 A1 | 6/2005 | Cross et al. | |
| 2005/0199554 A1 | 9/2005 | Goolsby et al. | |
| 2006/0108263 A1 | 5/2006 | Lin et al. | |
| 2007/0119300 A1 | 5/2007 | Yang et al. | |
| 2007/0122327 A1 | 5/2007 | Yang et al. | |
| 2007/0122619 A1 | 5/2007 | Yang et al. | |
| 2007/0289447 A1 | 12/2007 | Yang et al. | |
| 2007/0292328 A1 | 12/2007 | Yang et al. | |
| 2008/0210599 A1 | 9/2008 | O'Connor et al. | |
| 2009/0081092 A1 | 3/2009 | Yang et al. | |
| 2009/0136401 A1 | 5/2009 | Yang et al. | |

FOREIGN PATENT DOCUMENTS

EP 0043759 A1 1/1982
EP 0145539 6/1985

(Continued)

OTHER PUBLICATIONS

"Control of Mercury Emissions From Coal-Fired Electric Utility Boilers: Interim Report Including Errata Dated Mar. 21, 2002", *EPA Research and Development—EPA—600/R-01-109* Apr. 2002, 346 pgs.

(Continued)

*Primary Examiner* — Frank Lawrence, Jr.

(74) *Attorney, Agent, or Firm* — Melanie L Brown

(57) ABSTRACT

Sorbents for removal of mercury and other pollutants from gas streams, such as a flue gas stream from coal-fired utility plants, and methods for their manufacture and use are disclosed. The methods include injecting a sorbent consisting essentially of recovered and separated fluid cracking catalyst particles into a flue gas stream.

19 Claims, No Drawings

FOREIGN PATENT DOCUMENTS

| | | |
|---|---|---|
| EP | 0271618 | 6/1988 |
| EP | 0480603 A2 | 4/1992 |
| EP | 0484234 A2 | 5/1992 |
| EP | 0930091 A1 | 11/1998 |
| EP | 0930091 | 7/1999 |
| GB | 2124249 | 2/1984 |
| GB | 2124249 A | 2/1984 |
| WO | WO-01/85307 | 11/2001 |
| WO | WO-2007/149837 | 12/2007 |

OTHER PUBLICATIONS

"Control of Mercury Emissions From Coal-Fired Electric Utility Boilers: Interim Report Including Errata Dated Mar. 21, 2002 Appendix", Apr. 2002, 140 pgs.

"PCT Search Report", PCT/US2006/044711 Apr. 24, 2007, 3 pgs.

"PCT Search Report", PCT/US2007/071523 Nov. 23, 2007, 3 pgs.

\* cited by examiner

METHODS OF MANUFACTURING MERCURY SORBENTS AND REMOVING MERCURY FROM A GAS STREAM

CROSS-REFERENCE TO RELATED APPLICATIONS

This application claims the benefit of priority under 35 U.S.C. §120 to U.S. application Ser. No. 11/763,691, now issued as U.S. Pat. No. 7,753,992, filed Jun. 15, 2007, which claims the benefit of priority under 35 U.S.C. §119(e) to U.S. Provisional Application Ser. No. 60/805,188, filed Jun. 19, 2006, which are incorporated herein by reference.

FIELD OF THE INVENTION

Embodiments of the invention relate to sorbents for the removal of pollutants such as mercury from gas streams, methods for manufacturing sorbents and the use of sorbents in pollution control.

BACKGROUND

Emission of pollutants, for example, mercury, from sources such as coal-fired and oil-fired boilers has become a major environmental concern. Mercury (Hg) is a potent neurotoxin that can affect human health at very low concentrations. The largest source of mercury emission in the United States is coal-fired electric power plants. Coal-fired power plants account for between one-third and one-half of total mercury emissions in the United States. Mercury is found predominantly in the vapor-phase in coal-fired boiler flue gas. Mercury can also be bound to fly ash in the flue gas.

On Dec. 15, 2003, the Environmental Protection Agency (EPA) proposed standards for emissions of mercury from coal-fired electric power plants, under the authority of Sections 111 and 112 of the Clean Air Act. In their first phase, the standards could require a 29% reduction in emissions by 2008 or 2010, depending on the regulatory option chosen by the government. In addition to EPA's regulatory effort, in the United States Congress, numerous bills recently have been introduced to regulate these emissions. These regulatory and legislative initiatives to reduce mercury emissions indicate a need for improvements in mercury emission technology.

There are three basic forms of Hg in the flue gas from a coal-fired electric utility boiler: elemental Hg (referred to herein by the symbol Hg0); compounds of oxidized Hg (referred to herein the symbol Hg2+); and particle-bound mercury. Oxidized mercury compounds in the flue gas from a coal-fired electric utility boiler may include mercury chloride ($HgCl_2$), mercury oxide (HgO), and mercury sulfate ($HgSO_4$). Oxidized mercury compounds are sometimes referred to collectively as ionic mercury. This is because, while oxidized mercury compounds may not exist as mercuric ions in the boiler flue gas, these compounds are measured as ionic mercury by the speciation test method used to measure oxidized Hg. The term speciation is used to denote the relative amounts of these three forms of Hg in the flue gas of the boiler. High temperatures generated by combustion in a coal boiler furnace vaporize Hg in the coal. The resulting gaseous Hg0 exiting the furnace combustion zone can undergo subsequent oxidation in the flue gas by several mechanisms. The predominant oxidized Hg species in boiler flue gases is believed to be $HgCl_2$. Other possible oxidized species may include HgO, $HgSO_4$, and mercuric nitrate monohydrate ($Hg(NO_3)_2 \cdot H_2O$).

Gaseous Hg (both Hg0 and Hg2+) can be adsorbed by the solid particles in boiler flue gas. Adsorption refers to the phenomenon where a vapor molecule in a gas stream contacts the surface of a solid particle and is held there by attractive forces between the vapor molecule and the solid. Solid particles are present in all coal-fired electric utility boiler flue gas as a result of the ash that is generated during combustion of the coal. Ash that exits the furnace with the flue gas is called fly ash. Other types of solid particles, called sorbents, may be introduced into the flue gas stream (e.g., lime, powdered activated carbon) for pollutant emission control. Both types of particles may adsorb gaseous Hg in the boiler flue gas.

Sorbents used to capture mercury and other pollutants in flue gas are characterized by their physical and chemical properties. The most common physical characterization is surface area. The interior of certain sorbent particles are highly porous. The surface area of sorbents may be determined using the Brunauer, Emmett, and Teller (BET) method of $N_2$ adsorption. Surface areas of currently used sorbents range from 5 $m^2/g$ for Ca-based sorbents to over 2000 $m^2/g$ for highly porous activated carbons. EPA Report, Control of Mercury Emissions From Coal-Fired Electric Utility Boilers, Interim Report, EPA-600/R-01-109, April 2002. For most sorbents, mercury capture often increases with increasing surface area of the sorbent.

Mercury and other pollutants can be captured and removed from a flue gas stream by injection of a sorbent into the exhaust stream with subsequent collection in a particulate matter control device such as an electrostatic precipitator or a fabric filter. Adsorptive capture of Hg from flue gas is a complex process that involves many variables. These variables include the temperature and composition of the flue gas, the concentration of Hg in the exhaust stream, and the physical and chemical characteristics of the sorbent. Of the known Hg sorbents, activated carbon and calcium-based sorbents have been the most actively studied.

Currently, the most commonly used method for mercury emission reduction is the injection of powdered activated carbon into the flue stream of coal-fired and oil-fired plants. Currently, there is no available control method that efficiently collects all mercury species present in the flue gas stream. Coal-fired combustion flue gas streams are of particular concern because their composition includes trace amounts of acid gases, including $SO_2$ and $SO_3$, NO and $NO_2$, and HCl. These acid gases have been shown to degrade the performance of activated carbon. Though powdered activated carbon is effective to capture oxidized mercury species such as Hg+2, powdered activated carbon (PAC) is not as effective for elemental mercury which constitutes a major Hg species in flue gas, especially for subbituminous coals and lignite. There have been efforts to enhance the Hg0 trapping efficiency of PAC by incorporating bromine species. This, however, not only introduces significantly higher cost, but a disadvantage to this approach is that bromine itself is a potential environmental hazard. Furthermore, the presence of PAC hinders the use of the fly ash in the cement industry and other applications due to its color and other properties.

As noted above, alternatives to PAC sorbents have been utilized to reduce mercury emissions from coal-fired boilers. Examples of sorbents that have been used for mercury removal include those disclosed in United States Patent Application Publication No. 2003/0103882 and in U.S. Pat. No. 6,719,828. In United States Patent Application Publication No. 2003/0103882, calcium carbonate and kaolin from paper mill waste sludge were calcined and used for Hg removal at high temperatures above 170° C., preferably 500° C.

In addition, sorbents having metal sulfides on the sorbent particle surfaces and/or between layers of layered sorbents such as clay particles have been provided. Examples of such sorbents are described in U.S. Pat. No. 6,719,828 and pending, commonly assigned U.S. patent application Ser. No. 11/290,631 filed Nov. 30, 2005. In U.S. patent application Ser. No. 11/290,631, particles such as bentonite, kaolin, metakaolin, fly ash, zeolite, silica, alumina and common dirt having copper sulfide dispersed on the surface were shown to be effective mercury sorbents.

While sorbents modified with metal sulfides have showed promising results, the modification of the particles with a metal sulfide requires additional manufacturing steps and reagents. There is an ongoing need to provide improved pollution control sorbents and methods for their manufacture, particularly sorbents that are in abundant supply and require minimal processing.

DETAILED DESCRIPTION

Aspects of the invention include methods and systems for removal of heavy metals and other pollutants from gas streams. In particular, the methods and systems are useful for, but not limited to, the removal of mercury from flue gas streams generated by the combustion of coal. One aspect of the present invention relates to a sorbent comprising fluid cracking catalyst particles ("FCC particles"). The FCC particles may be obtained from the end stage or intermediate stage of an FCC particle manufacturing process, or alternatively, they may be generated during a fluid catalytic cracking process that uses FCC particles and generates FCC fine particles. In particular embodiments, the methods and systems utilize fluid cracking catalyst fine particles, which will be interchangeably referred to as "FCC fines" or "FCC fine particles". The fluid cracking catalyst fine particles may be recovered and separated from a fluid cracking catalyst manufacturing process or recovered and separated from a fluid catalytic cracking process that uses FCC particles and generates FCC fines. Another aspect of the invention pertains to sorbents comprising intermediate FCC fines, which are fine particles obtained from an intermediate step of a fluid cracking catalyst particle manufacturing process. In specific embodiments, zeolite-containing FCC fines and intermediate FCC fines are provided as sorbents for the removal of mercury from gas streams.

One or more embodiments of the invention are directed to methods of removing mercury and other pollutants from a flue gas stream comprising injecting a sorbent consisting essentially of recovered and separated fluid cracking catalyst (FCC) particles into the flue gas stream.

In another embodiment, a method of removing mercury and other pollutants from a gas stream, for example, from the flue gases of coal-fired and oil-fired boilers, is provided comprising injecting a sorbent comprising recovered and separated fluid cracking catalyst particles into the flue gas stream. In certain embodiments, the particles are fine particles. In one or more embodiments, the particles contain essentially no added metal sulfides on the surface of the particles.

According to one or more embodiments, the fine particles have an average particle diameter of less than about 40 microns, for example, an average particle diameter of between about 20 microns and 40 microns. In certain embodiments, the fine particles have an average particle diameter of less than about 20 microns.

In one or more embodiments, the fluid cracking catalyst particles contain at least one of zeolite, hydrous kaolin, metakaolin, sodium silicate, silica and alumina. The content of each component in FCC products can be present in an amount from zero to 100% by weight. The zeolite content of the particles according to one or more embodiments is less than about 90% by weight. In other embodiments, the zeolite content of the particles is less than about 50% by weight, and in yet another embodiment, the zeolite content is less than about 40% by weight. The zeolite is a Y-type zeolite according to one or more embodiments.

In certain embodiments, the zeolite particles are obtained from an intermediate stage of a FCC particle manufacturing process. According to one or more embodiments, the FCC particles are obtained prior to ion exchange during the manufacturing process.

Another aspect of the invention pertains to a method of manufacturing a mercury sorbent comprising recovering particles from a FCC particle manufacturing process, and packaging the particles for shipment. In one embodiment, the particles are recovered from an intermediate step of an FCC particle manufacturing process. In certain embodiments, FCC particles are recovered prior to ion exchange. According to one or more embodiments, the FCC particles include a zeolite, for example, a Y-type zeolite. Before describing several exemplary embodiments of the invention, it is to be understood that the invention is not limited to the details of construction or process steps set forth in the following description. The invention is capable of other embodiments and of being practiced or being carried out in various ways.

Aspects of the invention provide improved sorbents, which may be used to remove mercury and other pollutants from the flue gases of coal-fired and oil-fired boilers, methods for manufacturing such sorbents, and systems and methods utilizing these sorbents. In one or more embodiments, the sorbents comprise FCC catalyst particles that do not contain metal sulfides on the particle surface.

During the production of these FCC catalysts, an amount of fine particles in the range of about 0 to 40 μm in excess of that required for good fluidization in the refinery are often generated. Heretofore, a suitable use for these excess fine particles has not been found, and so they are therefore land-filled, which incurs cost for the plants. The disposal of the FCC waste by-products, referred as FCC fines, has been a long-standing concern for FCC manufacturing.

Thus, the use of FCC fines as a mercury removal injection sorbent not only provides an economical sorbent for processes that require a large volume of sorbent, but also helps solve the FCC waste disposal issue. Furthermore, since no additional raw materials or equipment is required to make the FCC fines sorbent, the use of FCC fines will result in significantly reduced sorbent manufacturing costs. From the point of view of environmental protection, this is an ideal case in which the land fill of FCC fines is eliminated, a sorbent is provided that removes mercury from flue gas streams, and the use of natural resources and energy for making the sorbent is reduced.

The terms "fluid cracking catalyst fines" or "FCC fines" are used herein to refer to fine solid particles obtained from a fluid cracking catalyst manufacturing process, such as described in, but not limited to U.S. Pat. Nos. 6,656,347 and 6,673,235, and to particles generated and separated during a fluid catalytic cracking process that uses FCC particles. For particles formed during a fluid catalytic cracking particles manufacturing process, the particles may be separated during one or more intermediate stages of the manufacturing process, or at an end stage. For example, the particles may be separated prior to ion exchange, and these particles may be referred to as "pre-ion exchange" particles. Alternatively, the particles may be separated after ion exchange, and these particles may be referred to as "ion exchanged particles" or "post-ion exchange particles." In another embodiment, the particles may be separated either before calcination, and may be referred to as "pre-calcination particles" or after calcination and may be referred to as "post-calcination particles." The terms "intermediate fluid cracking catalyst fines" or "intermediate FCC fines" refers to particles obtained during an intermediate stage of a fluid cracking catalyst powder manufacturing process. FCC catalysts containing about 15% of 0-40 μm fines are used for petroleum refining via a fluid cracking catalysis process.

Intermediate FCC fines or excess FCC fines are generated in the processes described in U.S. Pat. Nos. 6,656,347 and 6,673,235 in two principle ways. In the first route, pre-formed microspheres containing a mixture of calcined kaolins are immersed in sodium silicate solution to crystallize zeolite Y, and several percent of excess fines are generated over and above the amount present in the original microspheres. The fines can contain sodium form zeolite Y, gmelinite, and leached kaolin residue. The excess material is separated by centrifuge, settling and filtration, and then ordinarily discarded. The second route for fines formation is microsphere attrition during handling in the ion exchange portion of the manufacturing processes. Ion exchange is done to replace unwanted sodium with more desirable ions. Pneumatic transportation, rotary calcination and stirring lead to particle-particle and particle-wall collisions and the formation of fines. Several percent of excess fines are generated over and above the amount present in the required particle size distribution. The fines can contain ammonium/rare earth-form zeolite Y and gmelinite or their collapsed residues, and leached kaolin residue. These are also separated by centrifuge, settling and filtration, and then ordinarily discarded. Waste fines from the various latter stages of the process are combined together into this single process stream.

In one or more embodiments the catalyst fines are waste material obtained from a point in the catalyst manufacturing procedure after reaction to form a zeolite intermediate. In other embodiments, FCC fines are obtained after ion exchange as, for example, waste material from a drying step or from a calcining step. In one or more embodiments, the fines or fine particles have an average particle size of less than about 40 microns in diameter, for example, an average particle size of between about 20 and 40 microns in diameter microns in diameter. In other embodiments, the average particle size of the fine particles is less than about 20 microns in diameter.

In still other embodiments, FCC fines are obtained after the catalyst has been used in the catalytic cracking process in the oil refinery. The used FCC catalyst from the refinery is commonly referred to as "equilibrium catalyst" or E-cat, and this catalyst is of a reduced surface area and activity, and may contain contaminant metals such nickel, vanadium, iron and copper, as well as incremental amounts of sodium, calcium and carbon. Most of the existing equilibrium catalyst is of a larger particle size above 40 μm, typically about 80 μm, but equilibrium catalyst fines are also available. Some of the fines are nothing more than essentially fresh FCC catalyst with a particle size less than 40 μm, since the FCC hardware has limited success at retaining these particles. The other portion of the equilibrium catalyst fines is of a lower surface area and activity, and these are formed by particle-particle and particle-wall collisions during use which leads to particle attrition and fines. The two types of fines form a mixture that is not typically separated into its components. These fines are found in the bottoms of the FCC main distillation column or in collection devices such as an electrostatic precipitator or a wet gas scrubber. A portion of the fines is also lost to the atmosphere. The effectiveness of these materials has not been measured but it is presently speculated that these may be useful as a mercury adsorbent.

FCC manufacturing processes are known, and examples of manufacturing processes for zeolite-containing FCC particles are described in the patents cited above, as well as U.S. Pat. Nos. 3,663,165; 4,493,902 and 4,699,893, which are incorporated herein by reference. In one embodiment, as described in U.S. Pat. No. 3,663,165, preformed microspheres are obtained by calcining a spray dried slurry of hydrous kaolin clay at elevated temperature (e.g., 1800° F.) are suspended in an aqueous sodium hydroxide solution together with a small amount of finely divided metakaolin (e.g., kaolin clay calcined at 1350° F.). The suspension is aged and then heated until crystalline sodium faujasite appears in the microspheres and sodium silicate mother liquor is formed. The crystallized microspheres are ion-exchanged to produce a zeolitic cracking catalyst. Fines or fine particles can be obtained either prior to or after ion-exchange and used as a mercury sorbent as described further below.

As noted above, additional examples of processes for manufacturing FCC catalysts are described in commonly assigned U.S. Pat. Nos. 6,656,347 and 6,673,235, the contents of each patent being incorporated herein by reference. In U.S. Pat. No. 6,673,235, an FCC catalyst is made from microspheres, which initially contain kaolin, binder, and a matrix derived from a dispersible boehmite alumina and an ultra fine hydrous kaolin having a particulate size such that 90 Wt % of the hydrous kaolin particle are less than 2 microns, and which is pulverized and calcined through the exotherm. The microsphere is subsequently converted using standard in-situ Y zeolite growing procedures to make a Y-containing catalyst. Exchanges with ammonium and rare earth cations with appropriate calcinations provides an FCC catalyst that contains a transitional alumina obtained from the boehmite and a catalyst of a unique morphology to achieve effective conversion of hydrocarbon to cracked gasoline products with improved bottoms cracking under SCT FCC processing. Preparation of the Such a Fluid Cracking Catalyst, as described in U.S. Pat. No. 6,673,235, may involve an initial step of preparing microspheres comprising hydrous kaolin and/or metakaolin, a dispersible boehmite ($Al_2O_3$, $H_2O$), kaolin calcined through its characteristic exotherm and derived from ultra fine hydrous kaolin, and a binder. The microspheres are calcined to convert any hydrous kaolin component to metakaolin. The calcination process transforms the dispersible boehmite into a transitional alumina phase. The calcined microspheres are reacted with an alkaline sodium silicate solution to crystallize zeolite Y and ion-exchanged. The transitional alumina phase that results from the dispersible boehmite during the preparative procedure and which forms the matrix of the final catalyst, passivates the Ni and V that are deposited on to the catalyst during the cracking process, especially during cracking of heavy residuum feeds. This results in a substantial reduction in contaminant coke and hydrogen yields. Contaminant coke and hydrogen arise due to the presence of Ni and V and reduction of these byproducts significantly improves FCC operation.

In U.S. Pat. No. 6,656,347, novel zeolite microspheres are formed which are macroporous, have sufficient levels of zeolite to be very active and are of a unique morphology to achieve effective conversion of hydrocarbons to cracked gasoline products with improved bottoms cracking under SCT FCC processing. The novel zeolite microspheres are produced by a modification of technology described in U.S. Pat. No. 4,493,902. By using non-zeolite, alumina-rich matrix of the catalyst derived from an ultrafine hydrous kaolin source having a particulate size such that 90 wt. % of the hydrous kaolin particles are less than 2 microns, and which is pulverized and calcined through the exotherm, a macroporous zeolite microsphere is produced. Generally, the FCC catalyst matrix useful in the '347 patent to achieve FCC catalyst macroporosity is derived from alumina sources, such as kaolin calcined through the exotherm, that have a specified water pore volume.

It will be understood, of course, that the present invention should not be limited to the above cited FCC manufacturing processes. The techniques for manufacturing FCC catalysts referred to above, are often referred to in the art as in-situ techniques. Other techniques for manufacturing FCC catalysts may be utilized to provide sorbents used for mercury capture. For example, zeolite-containing FCC catalysts may be manufactured using a process in which the zeolitic component is crystallized and then incorporated into microspheres in a separate step. This type of manufacturing process may be referred to as an incorporation process for manufacturing FCC particles.

In one or more embodiments, the FCC fines sorbent particles comprise a mixture of zeolite, sodium silicates, metakaolin, silica, and alumina. In certain embodiments, the FCC particles are composed mainly of Y zeolite and minor components of sodium silicates, metakaolin, and additives such as silica and alumina. Y-type zeolite FCC catalysts are produced by growing a Y-type zeolite first from metakaolin and sodium silicate slurry, followed by rare earth ion-exchange, spraying and calcination.

In initial experiments to determine the mercury absorption of zeolite and FCC catalysts, these catalysts were tested for their ability to remove mercuric ions ($Hg^{+2}$) from water. The Hg capture efficiency was significantly lower than standard activated carbon. Several aluminosilicate minerals such as bentonite and fly ash were tested for removing mercury in flues gas and found their activity was also too low to be considered. When FCC fines with CuS on the surface of the fines were tested, the sorbent activity was good and comparable to those supported on other minerals like bentonite. However, when FCC fines alone without any metal sulfide on the surface of the FCC fines were injected into a flue gas stream, both the ionic and elemental mercury capture was acceptable. It is not presently understood which component(s) in the FCC fines are responsible for the high Hg activity since pure Y-type zeolite or La-exchanged Y-type zeolite gave lower Hg-capture efficiency than the FCC fines. However, the ability to remove Hg from flue gas by using FCC fines without additional trapping agents, such as metal sulfide, represents a breakthrough with many benefits as outlined above.

Without intending to limit the invention in any manner, the present invention will be more fully described by the following examples.

EXAMPLES

Several samples were prepared in accordance with the methods for manufacturing sorbent substrates described above.

Comparative Example 1

FCC Fines Containing CuS

Initial experiments focused on mixing FCC fines with CuS in accordance with methods described in U.S. patent application Ser. No. 11/290,631. Samples were made by grinding 2.90 g of $CuSO_4.5H_2O$ and 0.97 g of $CuCl_2.2H_2O$ and separately drying and grinding a wet cake obtained from a Fundabac® filter of an FCC manufacturing process.

The mixture of copper salts was added to 10.0 g of dried Y-zeolite, and the mixture was thoroughly ground. To this mixture, 4.16 g of $Na_2S.9H_2O$ was added, and the mixture was ground thoroughly. The wet paste was heated in an oven at 105° C. overnight. The dried material was ground and passed though a 325 mesh sieve. This sample is labeled as Sample D-CuS.

Example 2

Preparation of FCC Fines

A wet cake of Y-type zeolite FCC fines prior to ion exchange was obtained from a Fundabac® filter and was dried at 105° C. overnight. This sample contained sodium silicate mother liquor waste and had a high sodium content. A second wet cake was obtained after lanthanum ion exchange and was dried at 105° C. overnight. Each dried sample was separately passed through a 325 mesh sieve. The first sample obtained prior to ion exchange was labeled sample A, and the second, ion-exchanged sample was labeled sample B. A third sample labeled CBV100 was obtained from Zeolyst of Valley Forge, Pa. CBV100 is a 100% Y zeolite powder. This sample was labeled CBV100. A second sample of CBV100 was ion exchanged with La, and this sample is labeled CBV100-La. The main physical and chemical properties of these materials are shown below.

TABLE 1

| | Physical Properties | | | | | |
|---|---|---|---|---|---|---|
| | Surface Area ($m^2/g$) | | $N_2$ Pore Volume | $N_2$ Pore Diameter | Particle Size (μM) | |
| Substrate $N_2$ | ZSA | Total | (cc/g) | (nm) | $D_{50}$ | $D_{90}$ |
| Sample A | 241 | 273 | 0.23 | 3.3 | 11.9 | 33.5 |
| Sample B | 204 | 300 | 0.46 | 6.1 | 22.1 | 70.3 |
| CBV100 | 666 | 715 | 0.38 | 2.1 | 4.7 | 16.7 |

| | Main Chemical Composition (%) | | | | | | |
|---|---|---|---|---|---|---|---|
| | $SiO_2$ | $Al_2O_3$ | $Na_2O$ | LaO | $Fe_2O_3$ | $TiO_2$ | $K_2O$ | MgO + CaO |
| Sample A | 56.0 | 27.7 | 14.0 | 0.00 | 0.52 | 0.81 | 0.37 | 0.20 |
| Sample B | 60.9 | 26.7 | 6.5 | 2.94 | 0.90 | 0.96 | 0.12 | 0.14 |
| CBV100 | 65.3 | 21.6 | 12.6 | 0.00 | 0.03 | 0.01 | 0.01 | 0.20 |

Example 3

Initial Mercury Capture Efficiency Measurements

The mercury capture efficiency was measured by Western Kentucky University (CISET) using an in-flight reactor. The flue gas was produced in a coal-fired pilot plant and duct-piped into the reactor. Mercury speciation and assay was conducted using CEM and Ontario-hydro methods. The sorbent residence time in the reactor is 1 second, sorbent injection rate 4 lbs/MMCF, and flue gas temperature 150° C. Mercury Capture Efficiency (%) is Defined as:

100×[Hg(inlet)−Hg(outlet)]/[Hg(inlet)]

Table II lists the mercury capture efficiency of a total six sorbent samples for elemental mercury, Hg(0) and total mercury, Hg(T)=Hg(ionic)+Hg(0). For comparison, two reference materials are also listed: one is the current industry standard injection sorbent, Darco-LH brominated activated carbon obtained from Norit, and the other is BN100, which is CuS/bentonite sorbent produced at Engelhard Elyria plant prepared in accordance with the methods disclosed in U.S. application Ser. No. 11/291,091, filed on Nov. 30, 2005 (Now U.S. Publication No. 2007/0122327) and entitled Methods of Manufacturing Bentonite Pollution Control Sorbent. This sample was labeled Sample C.

|                   | Hg (inlet), ng/Nm$^3$ | | Efficiency, % | |
| --- | --- | --- | --- | --- |
| Sample            | Hg (T) | Hg (0) | Hg (T) | Hg (0) |
| Darco-LH          | 6000   | 4780   | 42.6   | 68.0   |
| Darco-LH (repeat 1) | 8332 | 3930   | 46.2   | 73.6   |
| Darco-LH (repeat 2) | 5460 | 1915   | 48.3   | 72.5   |
| Sample C          | 7818   | 2063   | 48.7   | 66.2   |
| Sample D-CuS      | 5900   | 4700   | 42.0   | 37.7   |
| Sample A          | 6120   | 4880   | 41.3   | 50.0   |
| Sample A (repeat 1) | 6028 | 2069   | 40.3   | 28.6   |
| Sample A (repeat 2) | 5745 | 2052   | 56.0   | 63.0   |
| Sample B          | 7979   | 3429   | 31.6   | 33.5   |
| CBV100            | 6320   | 3576   | 33.0   | 17.2   |
| CBV100-La         | 6864   | 5657   | 35.1   | 30.1   |

Sample D-CuS, which was a zeolite having CuS on the surface of the particles exhibited lower elemental mercury capture efficiency, but a good mercury capture efficiency that is comparable to those sorbents supported on other carriers such as bentonite. However, compared with the two reference materials of Darco-LH and BN100, FCC fines alone without added CuS (sample A) exhibited good Hg-capture efficiency for both Hg(T) and Hg(0), though low value of Hg(0). Repeat 1 of sample A exhibited lower mercury capture, but Repeat 2 was consistent with the first sample A and comparable to Darco-LH, an industry standard. The ion-exchanged FCC fines (sample B) exhibited a significantly lower Hg-capture efficiency than the samples that were obtained from the intermediate stage prior to ion exchange. Sample B also has lower sodium and zeolite content (ion-exchange capacity) and large particle size. To test if the differences in zeolite content and particle size contributed to the different performance, CBV100 was tested because it is a pure zeolite and has much smaller particle size. The Hg-capture efficiency of CBV100 was not better than the Sample C. As noted above, Sample C was ion-exchanged with rare earth (lanthanum) cations. To determine the effect of rare earth ion exchange on mercury capture, we also ion-exchanged CBV100 with lanthanum cations, washed and dried the sample. No significant difference was found between the CBV100 and its La-exchanged CBV100 sample.

Example 4

Mercury Leachability Test and Results of Na—Y Aluminosilicate Fines Adsorbent A TCLP (Toxicity Characteristic Leaching Procedure) test was conducted in a fixed bed reactor on Samples A and B from the above Examples. The samples were tested as follows: 0.5 gram of each sample was mixed with glass beads. The mixed sample was then subjected to loading on the fixed bed. The experimental temperature of the fixed bed was set at 150° C. The Hg(0) stream with a flow rate of 0.80 L/min and concentration at 100 ug/NM$^3$ was delivered to pass through the fixed bed for sorbent breakthrough tests. The PSA SCEM was used to monitor Hg(0) and also Hg(2+) concentrations downstream of the fixed bed until breakthrough occurred. There was no evidence that the Hg(0) stream changed its speciation after passing through the mixed samples in the fixed bed. Following the fixed bed tests, the mixed samples were analyzed via a leaching test. Samples were analyzed according to Method 1311 Toxicity Characteristic Leaching Procedure (TCLP). The sample was dissolved in an appropriate extraction solution then agitated for 19 hours. The leaching solution was analyzed by Leeman instrument for determination of mercury concentration.

The results show that leachable Hg is 0.03% for Sample A and 0.11% for Sample B. With 0.03% Hg leachability, the Sample A is classified as non-hazardous material. In other words, Sample A, a waste product from zeolite manufacturing not only effectively captures mercury in the flue gas, but also safely retains Hg in the spent adsorbent.

It will be apparent to those skilled in the art that various modifications and variations can be made to the present invention without departing from the spirit or scope of the invention. For example, while the sorbents disclosed herein are particularly useful for removal of mercury from the flue gas of coal-fired boilers, the sorbents can be used to remove heavy metals such as mercury from other gas streams, including the flue gas of municipal waste combustors, medical waste incinerators, and other Hg-emission sources. Thus, it is intended that the present invention cover modifications and variations of this invention provided they come within the scope of the appended claims and their equivalents.

What is claimed is:

1. A method of removing mercury and other pollutants from a flue gas stream comprising injecting a sorbent consisting essentially of recovered and separated fluid cracking catalyst (FCC) particles into the flue gas stream.

2. The method of claim 1, wherein the FCC particles are fine particles.

3. The method of claim 2, wherein the FCC particles contain essentially no added metal sulfides on the surface of the particles.

4. The method of claim 2, wherein the FCC particles have an average particle diameter of less than about 40 microns.

5. The method of claim 4, wherein the FCC particles have an average particle diameter in the range of about 20 microns to about 40 microns.

6. The method of claim 4, wherein the FCC particles have an average particle diameter of less than about 20 microns.

7. The method of claim 1, wherein the FCC particles contain at least one of zeolite, hydrous kaolin, metakaolin, sodium silicate, silica, and alumina.

8. The method of claim 7, wherein the content of each component is in the range from zero to 100% by weight.

9. The method of claim 7, wherein the zeolite is a y-type zeolite.

10. The method of claim 7, wherein the FCC particles are obtained from an intermediate stage of an FCC manufacturing process.

11. The method of claim 10, wherein the FCC particles are separated by one or more of a centrifuge, settling and filtration.

12. The method of claim 10, wherein the FCC particles are obtained prior to ion exchange.

13. The method of claim 10, wherein the FCC particles are obtained after ion exchange.

14. The method of claim 10, wherein the FCC particles are obtained prior to calcination.

15. The method of claim 10, wherein the FCC particles are obtained after calcination.

16. The method of claim 1, wherein the flue gas stream originates from a coal-fired boiler.

17. The method of claim 1, wherein the flue gas stream originates from an oil-fired boiler.

18. The method of claim 1, wherein the flue gas stream originates from municipal waste combustion.

19. The method of claim 1, wherein the flue gas stream originates from a medical waste incinerator.

* * * * *